United States Patent
Melendez Valdez et al.

(10) Patent No.: US 11,619,076 B2
(45) Date of Patent: Apr. 4, 2023

(54) CABLE RETURN ASSIST ASSEMBLY FOR VEHICLE LATCH MECHANISM

(71) Applicant: Inteva Products, LLC, Troy, MI (US)

(72) Inventors: Luis Arturo Melendez Valdez, Chih. (MX); Hector Sanchez, Chih. (MX); Donald Michael Perkins, Warren, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 17/512,134

(22) Filed: Oct. 27, 2021

(65) Prior Publication Data

US 2022/0136288 A1     May 5, 2022

Related U.S. Application Data (60) Provisional application No. 63/107,286, filed on Oct. 29, 2020.

(51) Int. Cl.
*F16C 1/12*     (2006.01)
*E05B 79/20*   (2014.01)

(52) U.S. Cl.
CPC ............... *E05B 79/20* (2013.01); *F16C 1/12* (2013.01)

(58) Field of Classification Search
CPC .......... E05B 53/005; E05B 79/20; F16C 1/10; F16C 1/101; F16C 1/12; F16C 1/14; F16C 1/145; F16C 1/16
See application file for complete search history.

(56) References Cited

U.S. PATENT DOCUMENTS

| | | | | |
|---|---|---|---|---|
| 4,917,418 A * | 4/1990 | Gokee | ..................... | B60K 15/05 292/171 |
| 5,002,251 A * | 3/1991 | Kranenberg | .......... | B60R 13/005 428/31 |
| 5,027,929 A * | 7/1991 | Ratke | ........................ | F16C 1/10 74/519 |
| 5,048,878 A * | 9/1991 | Takeshita | ............ | E05B 63/0056 292/171 |
| 5,377,556 A * | 1/1995 | Byrnes | ..................... | F16G 11/12 74/502 |
| 6,349,613 B1 * | 2/2002 | Tsuge | ........................ | F16C 1/16 74/501.5 R |
| 6,386,338 B1 * | 5/2002 | Powrozek | ............... | B60T 7/107 74/625 |
| 6,732,516 B2 * | 5/2004 | Butera | ..................... | F03G 7/065 60/527 |

(Continued)

FOREIGN PATENT DOCUMENTS

GB          2528543 A   *  1/2016   .............. F16C 1/101

*Primary Examiner* — Brian J McGovern
(74) *Attorney, Agent, or Firm* — Cantor Colburn LLP (57) ABSTRACT

A cable return assist assembly for a vehicle latch mechanism, including: a housing; a cable; a guide feature secured to the cable; and a spring positioned about the cable, the spring contacting the housing at one end of the spring and the guide feature at an opposite end of the spring when the cable, the spring and the guide feature are installed into the housing, the housing having an opening that allows the spring and the guide feature to be inserted into a cavity of the housing and a portion of the cable is received in a first opening located at one end of the housing and another portion of the cable is received in a second opening located at an opposite end of the housing.

20 Claims, 6 Drawing Sheets

(56) References Cited

U.S. PATENT DOCUMENTS

| | | | |
|---|---|---|---|
| 7,764,159 B2* | 7/2010 | Zanella | F03G 7/065 |
| | | | 337/140 |
| 8,408,365 B2* | 4/2013 | Biasiotto | F16C 11/103 |
| | | | 188/67 |
| 10,022,782 B1* | 7/2018 | Weber | B21J 15/043 |
| 10,234,060 B1* | 3/2019 | Ficyk | F16C 1/223 |
| 2015/0251257 A1* | 9/2015 | Shaw | B23D 57/0015 |
| | | | 30/380 |
| 2017/0043420 A1* | 2/2017 | Shaw | B23D 57/0015 |
| 2020/0109739 A1* | 4/2020 | Panikulangara | F16C 1/223 |

* cited by examiner

CABLE RETURN ASSIST ASSEMBLY FOR VEHICLE LATCH MECHANISM

CROSS REFERENCE TO RELATED APPLICATIONS

This application claims priority to U.S. Provisional Patent Application No. 63/107,286 filed on Oct. 29, 2020, the entire contents of which are incorporated herein by reference thereto.

BACKGROUND

Exemplary embodiments of the present disclosure relate generally to latch mechanisms and, more particularly, cable assemblies for use with vehicle latch mechanisms.

Vehicle latch mechanisms may include multiple cables, each coupled to a lever for carrying out various functions, such as locking and releasing the latch for example. Often, these cables have to be connected to the latch. In addition, other components of the latch or the vehicle interior may interfere with the assembly of the cable to the latch. This can make the assembly process difficult, time consuming, costly and prone to error.

During use a vehicle latch mechanism may be operated through manipulation of a cable secured to the vehicle latch mechanism, which when actuated moves from a first position to a second position. Once the cable reaches the second position it is desirable to return it to its first position for subsequent actuation by for example, a spring return assembly.

Accordingly, it is desirable to an improved cable return spring assembly that is easy to assembly and provides improved performance.

SUMMARY OF THE DISCLOSURE

Disclosed is a cable return assist assembly for a vehicle latch mechanism, including: a housing; a cable; a guide feature secured to the cable; and a spring positioned about the cable, the spring contacting the housing at one end of the spring and the guide feature at an opposite end of the spring when the cable, the spring and the guide feature are installed into the housing, the housing having an opening that allows the spring and the guide feature to be inserted into a cavity of the housing and a portion of the cable is received in a first opening located at one end of the housing and another portion of the cable is received in a second opening located at an opposite end of the housing.

In addition to one or more of the features described above, or as an alternative to any of the foregoing embodiments, one end of the cable has a loop portion at one end and an another portion of the cable is covered by a sheath portion that is slidably received on the cable.

In addition to one or more of the features described above, or as an alternative to any of the foregoing embodiments, the sheath portion is a foam member.

In addition to one or more of the features described above, or as an alternative to any of the foregoing embodiments, the guide feature has a "T" shape.

In addition to one or more of the features described above, or as an alternative to any of the foregoing embodiments, the guide feature has a main body portion fixedly secured to the cable and two arm portions that extend from opposite sides of the main body portion.

In addition to one or more of the features described above, or as an alternative to any of the foregoing embodiments, the guide feature is formed as a single unitary structure.

In addition to one or more of the features described above, or as an alternative to any of the foregoing embodiments, the housing has a pair of opposing flange members that retain the guide feature, the cable and the spring the cavity of the housing as the cable slides therein and as the spring is compressed and/or uncompressed.

In addition to one or more of the features described above, or as an alternative to any of the foregoing embodiments, the housing has a pair of opposing flange members that retain the guide feature, the cable and the spring the cavity of the housing as the cable slides therein and as the spring is compressed and/or uncompressed.

In addition to one or more of the features described above, or as an alternative to any of the foregoing embodiments, the first opening is a slotted opening located on one side of the housing and the second opening is a slotted opening located on an opposite side of the housing.

In addition to one or more of the features described above, or as an alternative to any of the foregoing embodiments, the first opening is a slotted opening located on one side of the housing and the second opening is a slotted opening located on an opposite side of the housing.

In addition to one or more of the features described above, or as an alternative to any of the foregoing embodiments, the housing includes an attachment feature for securing the housing to a portion of a vehicle.

In addition to one or more of the features described above, or as an alternative to any of the foregoing embodiments, the attachment feature may have a plurality of spring biased arms.

In addition to one or more of the features described above, or as an alternative to any of the foregoing embodiments, a portion of the guide feature is larger than the first opening such that the guide feature is not received within opening as the cable slides within the cavity of the housing.

In addition to one or more of the features described above, or as an alternative to any of the foregoing embodiments, one end of the cable has a loop portion at one end and an another portion of the cable is covered by a sheath portion that is slidably received on the cable and the housing has a recess that receives a portion of the sheath portion therein and the recess is open to a slot aligned with a slot of the first opening.

In addition to one or more of the features described above, or as an alternative to any of the foregoing embodiments, a fastening portion of the cable adjacent to the loop portion prevents the cable from sliding back into the cavity of the housing once the cable is located within the second opening.

In addition to one or more of the features described above, or as an alternative to any of the foregoing embodiments, the sheath portion is a foam member.

In addition to one or more of the features described above, or as an alternative to any of the foregoing embodiments, the housing includes portions located on an opposite side of the housing with respect to the pair of opposing flange members for retaining the guide feature, the cable and the spring the cavity of the housing as the cable slides therein and as the spring is compressed and/or uncompressed.

Also is disclosed is a method for assembling a cable return assist assembly for a vehicle latch mechanism, including: inserting a cable, a guide feature and a spring into an opening of a housing of the cable return assist assembly, the guide feature being secured to the cable and the spring being located about the cable, the spring contacting the housing at one end of the spring and the guide feature at an opposite end of the spring when the cable, the spring and the guide feature are installed into the housing; and locating a portion of the cable in a first opening located at one end of the housing and another portion of the cable in a second opening located at an opposite end of the housing.

In addition to one or more of the features described above, or as an alternative to any of the foregoing embodiments, one end of the cable has a loop portion at one end and another portion of the cable is covered by a sheath portion that is slidably received on the cable.

In addition to one or more of the features described above, or as an alternative to any of the foregoing embodiments, the first opening is a slotted opening located on one side of the housing and the second opening is a slotted opening located on an opposite side of the housing and the housing has a pair of opposing flange members that retain the guide feature, the cable and the spring the cavity of the housing as the cable slides therein and as the spring is compressed and/or uncompressed.

BRIEF DESCRIPTION OF THE DRAWINGS

Embodiments of the present disclosure will now be described, by way of example only, with reference to the accompanying drawings in which.

DETAILED DESCRIPTION

Various embodiments of the present disclosure are directed to a cable return assist assembly 10 for a vehicle latch mechanism. As illustrated in FIGS. 1-9. The cable return assist assembly 10 includes a housing 12 that is configured to receive a cable 14, a spring 16 and a guide feature 18. One end of the cable 14 may have a loop portion 20 at one end and another portion of the cable 14 is covered by a sheath portion 22 that is slidably received on the cable. In one non-limiting embodiment, the sheath portion 22 may be a foam portion or member slidably received on a portion of cable 14. In one embodiment, the guide feature 18 has a "T" shape or a main body portion 24 fixedly secured to the cable 14 with two arm portions or features 26 that extend from opposite sides of the main body portion 24. In one embodiment, the guide feature 18 is formed as a single unitary structure.

The housing 12 has a pair of opposing flange members 28 that retain the guide feature 18 and accordingly the cable 14 and spring 16 in a cavity 30 of the housing 12 as the cable 14 slides therein and the spring 16 is compressed and/or uncompressed.

Figure 1:
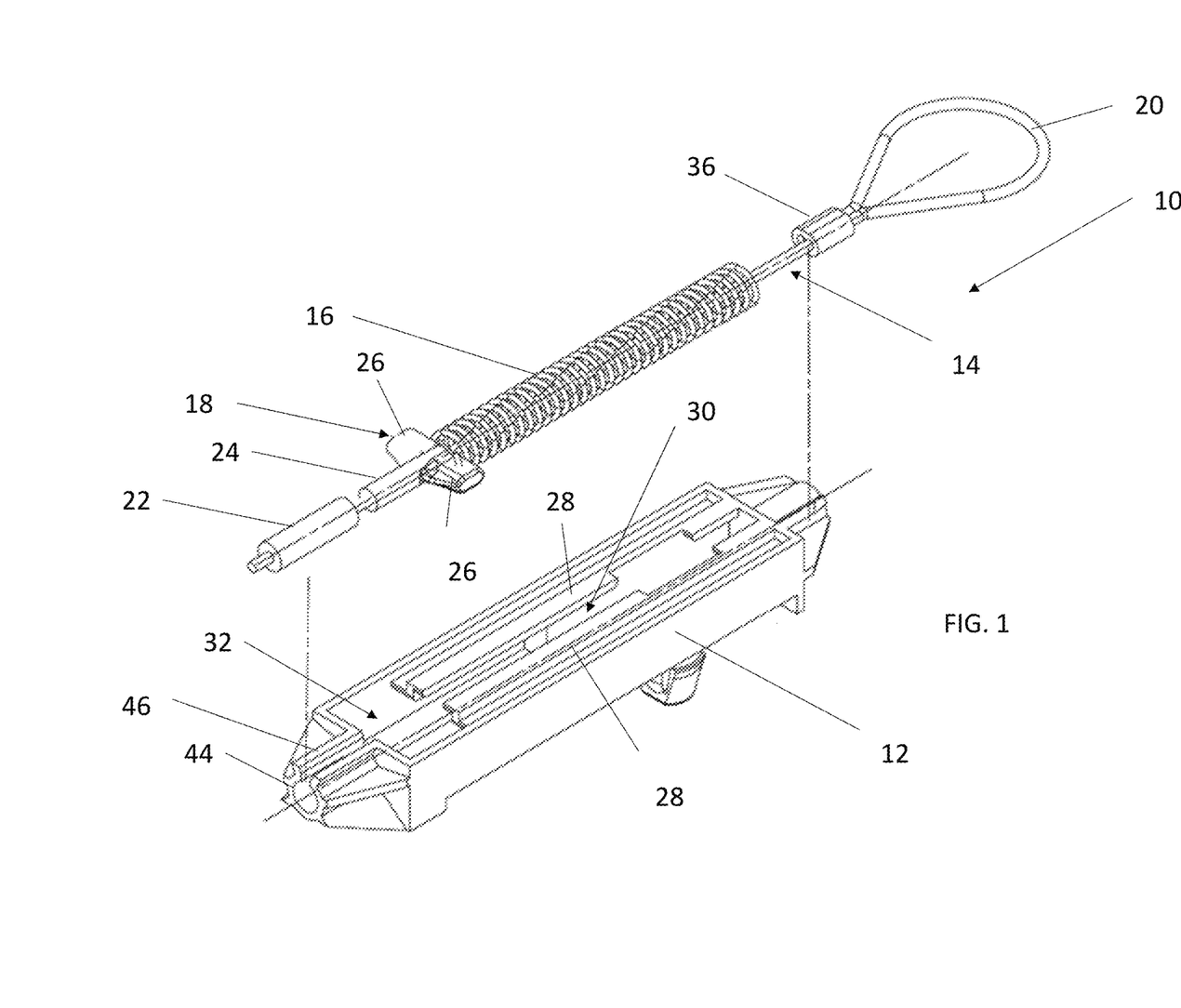
FIG. 1 is an exploded view of a cable return assist assembly for a vehicle latch mechanism in accordance with the present disclosure.
Figures 2, 3:
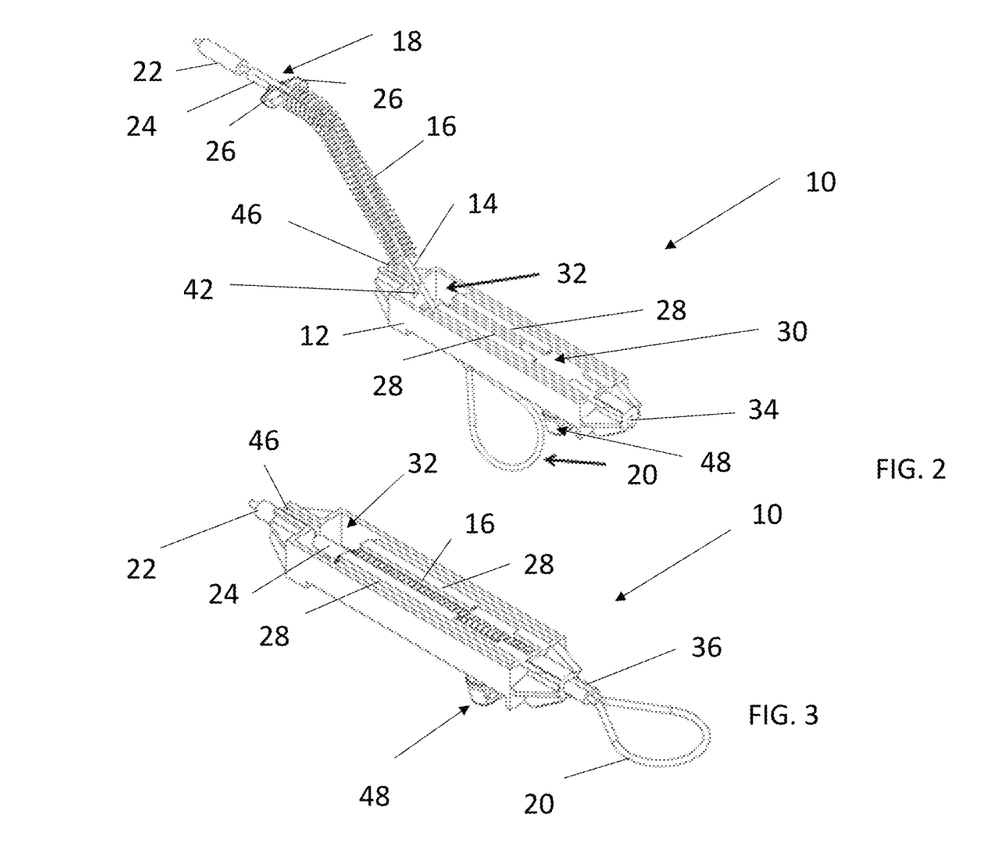
FIGS. 2 and 3 illustrate an assembly process of the cable return assist assembly in accordance with the present disclosure.

FIGS. 2 and 3 illustrate the assembly of the cable 14, spring 16 and guide feature 18 into the cavity 30 of the housing 12. In FIG. 2 the cable 14 via loop portion 20 is pulled into an opening 32 of the housing 12 until it extends through to an opposite side of the housing 12. Thereafter the spring 16 and guide feature 18 are slid horizontally in cavity 30 until a portion of the cable is located withing an opening 34 located as one end of the housing 12. In one embodiment, the opening 34 is a slot or slotted opening that allows insertion of a portion of cable 14 therein. Afterwards a fastening portion 36 of the cable 14 that helps provide loop portion 20 prevents the cable 14 from sliding back into the cavity 30 of the housing once the cable is located in the position illustrated in at least FIG. 3. At this point the guide feature 18 and spring 16 are now trapped in cavity 30 by at least flanges 28 and opposing portions 38 and 40 located on an opposite side of the housing 12.

Referring back now to at least FIG. 1 a portion of the cable 14 will be received within an opening 42. In one embodiment, the opening 42 is a slot or slotted opening that allows insertion of a portion of cable 14 therein. Afterwards the cable sheath 22 and the main body portion 24 of the guide feature 18 are located on opposite sides of opening 42. In one embodiment and as illustrated, the main body portion 24 of the guide feature 18 is larger than opening 42 such that the main body portion 24 of the guide feature 18 is not received within opening 42 as cable 14 slides within cavity 30 of the housing 12. The housing 12 is also configured to have a recess 44 that receives a portion of the sheath 22 therein. Recess 44 is also open to a slot 46 aligned with the slot of opening 42.

In one embodiment, the openings 34, 42 and their associated slots for receipt of the cable 14 therein are located on opposite sides of the housing such that the cable 14 is inserted to the openings 34, 42 though their associated slots on opposite sides of the housing.

Figure 4:
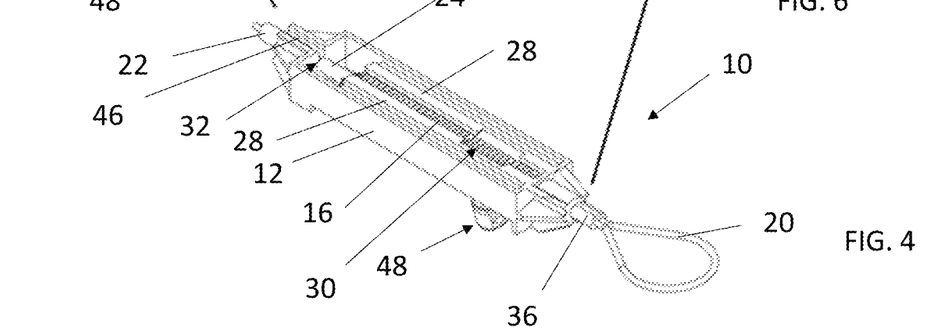
FIG. 4 is a perspective view of the cable return assist assembly in accordance with the present disclosure.
Figure 5:
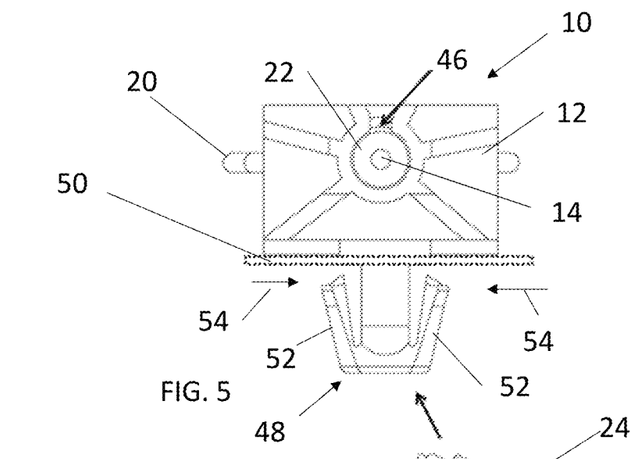
FIG. 5 is a first end view of the cable return assist assembly in accordance with the present disclosure.
Figure 6:
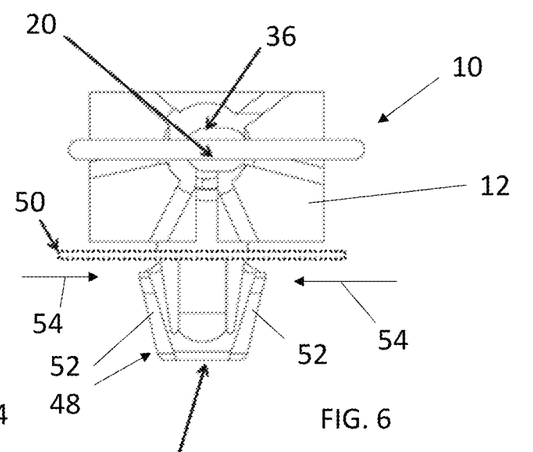
FIG. 6 is a second end view of the cable return assist assembly in accordance with the present disclosure, the second end view being opposite to the first end view of FIG. 5.
Figure 7:
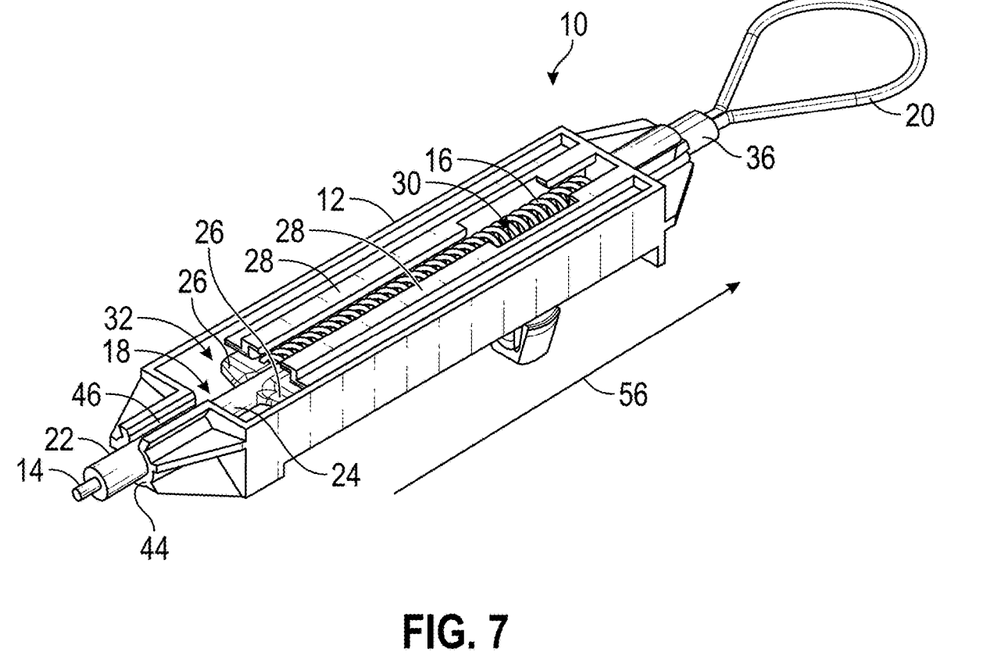
FIG. 7 is a perspective view of the cable return assist assembly in accordance with the present disclosure.
Figure 8:
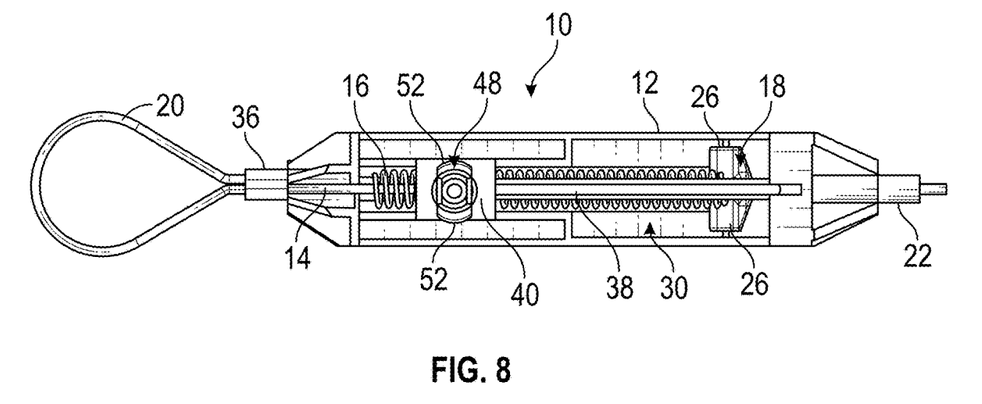
FIG. 8 is a bottom view of the cable return assist assembly in accordance with the present disclosure.
Figure 9:
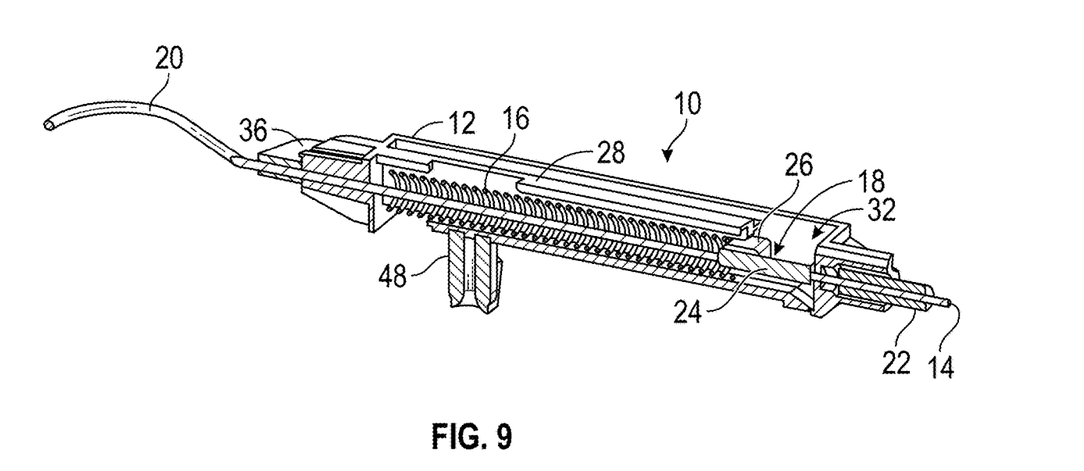
FIG. 9 is a perspective cross-sectional view of the cable return assist assembly in accordance with the present disclosure.

Referring now to at least FIGS. 4-6, the housing 12 includes an attachment feature 48 for securing the housing 12 to a portion 50 of the vehicle. In one embodiment the portion 50 of the vehicle is a sheet metal portion with an opening configured to receive attachment feature 48 therein. As illustrated, attachment feature 48 may have a plurality of spring biased arms 52 that are deflected inward in the directions of arrows 54 from the position illustrated in FIGS. 5 and 6 and once the spring biased arms 52 pass through the opening of portion 50 the plurality of spring biased arms 52 move back in the direction opposite to arrows 54 to the position illustrated in FIGS. 5 and 6 such that the housing 12 is now secured to the portion 50 of the vehicle.

Once the cable 14 is secured to housing 12 and sheath 22 is received in opening 44 and when a user applied force is applied to loop 20 in the direction of arrow 56 an end portion of the spring 16 will contact a portion of the housing 12 adjacent to opening 34 and spring 16 will be compressed. At the same time cable 14 and guide feature 18 will slide in cavity 30 while sheath 22 is retained in opening 44. Thereafter and once the user applied force in the direction of arrow 56 is released, the compressed spring 16 will apply a force to guide feature 18 in a direction opposite to arrow 56. Since the guide feature 18 is fixedly secured to the cable 14, cable will slide in a direction opposite to arrow 56 until it reaches its original or first position illustrated in at least FIGS. 3, 4, 5, 6 and 7, which would be prior to the application of the user applied force in the direction 56.

The cable return assist assembly 10 of the present disclosure avoids excessive drag on the cable which may be attributable due to the length of cable, or routing of the cable. Thus, the cable return assist assembly 10 allows a user or the assembly to back drive the cable 14 after a user pulls the loop 20 and it is returned to its initial position by the biasing force of spring 16.

In one non-limiting embodiment, the housing 12 and attachment feature 48 are formed from an easily molded material such as plastic or equivalents thereof such that the plurality of spring biased arms are provided with their spring bias.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A cable return assist assembly for a vehicle latch mechanism, comprising:
    a housing;
    a cable;
    a guide feature secured to the cable; and
    a spring positioned about the cable, the spring contacting the housing at one end of the spring and the guide feature at an opposite end of the spring when the cable, the spring and the guide feature are installed into the housing, the housing having an opening that allows the spring and the guide feature to be inserted into a cavity of the housing and a portion of the cable is received in a first opening located at one end of the housing and another portion of the cable is received in a second opening located at an opposite end of the housing.

2. The cable return assist assembly as in claim 1, wherein one end of the cable has a loop portion and another portion of the cable is covered by a sheath portion that is slidably received on the cable.

3. The cable return assist assembly as in claim 2, wherein the sheath portion is a foam member.

4. The cable return assist assembly as in claim 1, wherein the guide feature has a "T" shape.

5. The cable return assist assembly as in claim 1, wherein the guide feature has a main body portion fixedly secured to the cable and two arm portions that extend from opposite sides of the main body portion.

6. The cable return assist assembly as in claim 5, wherein the guide feature is formed as a single unitary structure.

7. The cable return assist assembly as in claim 5, wherein the housing has a pair of opposing flange members that retain the guide feature, the cable and the spring in the cavity of the housing as the cable slides therein and as the spring is compressed and uncompressed.

8. The cable return assist assembly as in claim 7, wherein the housing includes portions located on an opposite side of the housing with respect to the pair of opposing flange members for retaining the guide feature, the cable and the spring in the cavity of the housing as the cable slides therein and as the spring is compressed and uncompressed.

9. The cable return assist assembly as in claim 1, wherein the housing has a pair of opposing flange members that retain the guide feature, the cable and the spring in the cavity of the housing as the cable slides therein and as the spring is compressed and uncompressed.

10. The cable return assist assembly as in claim 9, wherein the first opening is a slotted opening and the second opening is a slotted opening.

11. The cable return assist assembly as in claim 1, wherein the first opening is a slotted opening and the second opening is a slotted opening.

12. The cable return assist assembly as in claim 11, wherein a portion of the guide feature is larger than the first opening such that the portion of the guide feature is not received within the first opening as the cable slides within the cavity of the housing.

13. The cable return assist assembly as in claim 12, wherein one end of the cable has a loop portion and another portion of the cable is covered by a sheath portion that is slidably received on the cable and the housing has a recess that receives a portion of the sheath portion therein and the recess is open to a slot aligned with a slot of the first opening.

14. The cable return assist assembly as in claim 13, wherein a fastening portion of the cable adjacent to the loop portion prevents the cable from sliding back into the cavity of the housing once the cable is located within the second opening.

15. The cable return assist assembly as in claim 14, wherein the sheath portion is a foam member.

16. The cable return assist assembly as in claim 1, wherein the housing includes an attachment feature for securing the housing to a portion of a vehicle.

17. The cable return assist assembly as in claim 16, wherein the attachment feature has a plurality of spring biased arms.

18. A method for assembling a cable return assist assembly for a vehicle latch mechanism, comprising:
    inserting a cable, a guide feature and a spring into an opening of a housing of the cable return assist assembly, the guide feature being secured to the cable and the spring being located about the cable, the spring contacting the housing at one end of the spring and the guide feature at an opposite end of the spring when the cable, the spring and the guide feature are installed into the housing; and
    locating a portion of the cable in a first opening located at one end of the housing and another portion of the cable in a second opening located at an opposite end of the housing.

19. The method as in claim 18, wherein one end of the cable has a loop portion at one end and another portion of the cable is covered by a sheath portion that is slidably received on the cable.

20. The method as in claim 19, wherein the first opening is a slotted opening and the second opening is a slotted opening and the housing has a pair of opposing flange members that retain the guide feature, the cable and the spring in a cavity of the housing as the cable slides therein and as the spring is compressed and uncompressed.

* * * * *